United States Patent [19]

Yamaguchi

[11] Patent Number: 4,469,190

[45] Date of Patent: Sep. 4, 1984

[54] FUEL TANK ASSEMBLY FOR A MOTORCYCLE

[75] Inventor: Ken Yamaguchi, Saitama, Japan

[73] Assignee: Honda Giken Kogyo Kabushiki Kaisha, Tokyo, Japan

[21] Appl. No.: 418,962

[22] Filed: Sep. 16, 1982

[30] Foreign Application Priority Data

| Sep. 19, 1981 | [JP] | Japan | 56-139158[U] |
| Oct. 28, 1981 | [JP] | Japan | 56-171325 |
| Oct. 28, 1981 | [JP] | Japan | 56-171327 |
| Oct. 28, 1981 | [JP] | Japan | 56-171328 |
| Nov. 7, 1981 | [JP] | Japan | 56-177834 |
| Nov. 7, 1981 | [JP] | Japan | 56-177835 |
| Nov. 7, 1981 | [JP] | Japan | 56-177836 |
| Nov. 7, 1981 | [JP] | Japan | 56-177837 |
| Nov. 7, 1981 | [JP] | Japan | 56-177838 |
| Nov. 7, 1981 | [JP] | Japan | 56-177839 |
| Dec. 3, 1981 | [JP] | Japan | 56-195031 |
| Jan. 8, 1982 | [JP] | Japan | 57-933[U] |

[51] Int. Cl.³ .............................. B62J 35/00
[52] U.S. Cl. .................... 180/219; 137/575; 280/5 A
[58] Field of Search .......... 280/5 A, 5 R; 180/219, 180/225, ; 137/571, 575; 244/135 R

[56] References Cited

U.S. PATENT DOCUMENTS

| 3,586,363 | 6/1971 | Omlid | 137/575 X |
| 4,347,909 | 9/1982 | Takemura | 180/225 |
| 4,396,084 | 8/1983 | Yoshimura | 280/5 A |

FOREIGN PATENT DOCUMENTS

| 171810 | 12/1951 | Austria | 180/219 |
| 957020 | 1/1957 | Fed. Rep. of Germany | 137/575 |

Primary Examiner—John A. Pekar
Attorney, Agent, or Firm—Sughrue, Mion, Zinn, Macpeak & Seas

[57] ABSTRACT

A fuel tank assembly for a motorcycle includes a main tank and an auxiliary tank joined by a fuel hose or pipe. A breather pipe having an inlet in an upper portion of the auxiliary tank extends to a position proximate the fuel inlet of the main tank to exhaust air from the auxiliary tank to increase its effective capacity. The breather may extend either separately from or within the fuel pipe and may be provided either internally or partially externally of the main tank; the auxiliary tank may be provided with a pump operable when a low fuel level is reached in the main tank, which increases the freedom of placement of the auxiliary tank relative to the carburetor.

20 Claims, 34 Drawing Figures

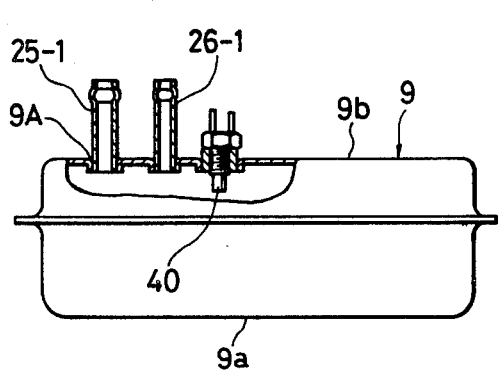
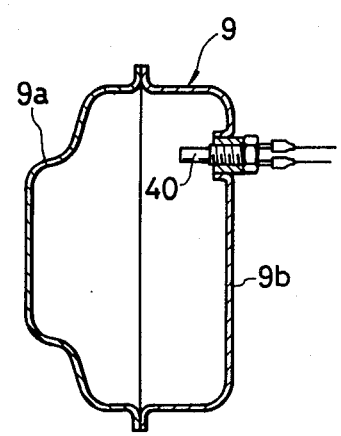
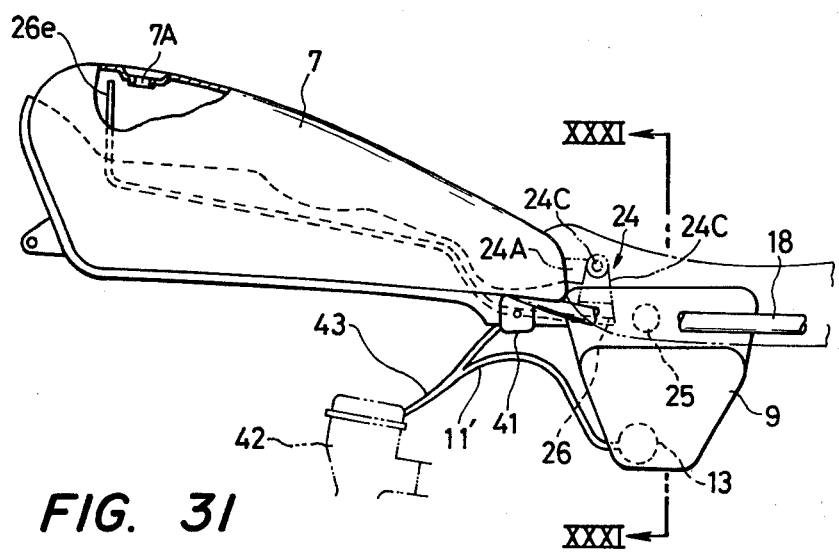
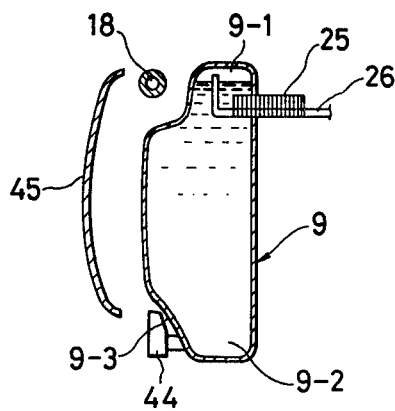

FUEL TANK ASSEMBLY FOR A MOTORCYCLE

BACKGROUND OF THE INVENTION

This invention relates to an improvement in the fuel tank assembly for a motorcycle comprising an main tank and an auxiliary tank.

An auxiliary fuel tank is provided to make up for the shortage in fuel supply offered by a main tank of a motorcycle having a large displacement, or a motorcycle in which space limitations prevent the use of a sufficiently large main tank. In a motorcycle having two such tanks, it is possible that the main tank may be full of fuel before the auxiliary tank is filled, depending on the positions in which they are mounted. This may result in a failure to utilize the full capacity of the auxiliary tank.

The fuel tanks are usually secured rigidly to the body frame by bolts or the like. The maintenance or inspection of any part under the tanks requires the removal of the tanks from the vehicle body. The presence of a fuel pipe connected to the tanks makes such maintenance and inspection a more cumbersome and difficult job. The fuel pipe connected between the main and auxiliary tanks is usually limited in its free movement, such as bending, expansion or contraction. This imposses serious limitations on the movement of any such tank for its inspection or the inspection of any part thereunder. It is also necessary that the fuel pipe be protected against damage, and have a pleasant appearance.

SUMMARY OF THE INVENTION

It is an object of this invention to provide a fuel tank assembly of a construction capable of filling fuel into main and auxiliary tanks within a short period by easy fuel injection thereinto.

It is still another object of this invention to provide a fuel tank assembly of a construction which enables utilization of the fuel capacity of its main and auxiliary tanks.

It is still another object of this invention to provide a motorcycle having a fuel tank assembly to mounted on a vehicle body as to enable easy inspection and maintenance of any other part without tank removal.

It is still another object of this invention to provide a fuel tank assembly which allows the fuel tanks to move more freely.

It is a further object of this invention to provide a fuel tank assembly comprising a main tank and an auxiliary tank connected to each other by a fuel pipe which is protected against damage from any external source, and which presents a pleasant appearance.

According to this invention, these objects are attained by a fuel tank assembly comprising a main tank and an auxiliary tank connected to each other by a fuel pipe, and a breather pipe extending between an opening in the top of the auxiliary tank and a point in the main tank in the vicinity of its fuel inlet.

According to a first embodiment of this invention, the auxiliary tank is disposed below the main tank, and the breather pipe extends through the main tank to connect an opening in the top of the auxiliary tank and a point in the main tank in the vicinity of its fuel inlet. The main tank, which is mounted on a body frame, has one end which is removable from the frame, while the other end thereof is rotatably secured to the frame, and the fuel pipe is, for example, a flexible pipe in the form of a bellows. The main pipe and the breather pipe are disposed between a pair of transversely spaced frame pipes, and extend into the main tank through its bottom wall.

According to a second embodiment of this invention, the main tank is formed by an outer plate defining the upper portion thereof and a bottom plate defining a lower portion. The outer plate has at least a portion surrounded by a seat, side cover or the like, a breather pipe extending into the main tank.

According to a third embodiment of this invention, the fuel and breather pipes form a unitary tubular structure of a double-walled construction between the main and auxiliary tanks.

According to a fourth embodiment of this invention, the breather pipe lies along the inner surface of the bottom plate of the main tank, and is secured thereto.

In any of these embodiments, that end of the breather pipe which is open in the main tank is disposed away from the position assumed by a fuel injection nozzle when the same inserted into the main tank through its fuel inlet.

According to a fifth embodiment of this invention, the breather pipe is connected to a connecting pipe outwardly of the main tank instead of extending through the main tank, whereby the capacity of the main tank is increased accordingly. The breather pipe is secured in the main tank in front of its fuel outlet connected to the fuel pipe, and opens in the main tank. The breather pipe is connected to one end of the connecting pipe, while the other end of the connecting pipe is connected to the top of the auxiliary tank.

According to a further aspect of this invention, a removable cap closing the fuel inlet of the main tank is provided with a U-shaped breather passage having a pair of forwardly facing open ends. One end of the passage faces the exterior of the tank, while the other end faces its interior.

This invention is also applicable to a fuel tank assembly having a sensor for detecting the quantity of the remaining fuel. This sensor is provided on the auxiliary tank. The fuel is supplied to the carburetors through the auxiliary tank.

According to a further embodiment of this invention, fuel is supplied from both the main and auxiliary tanks to the carburetors. The auxiliary tank is mounted between vehicle frame members so that it may be protected against damage by an external source, and its top is located at a level above the frame members so that it may have an increased capacity. The fuel pipe and the breather pipe extend horizontally in mutually parallel relationship from one side of the auxiliary tank to the main tank. This arrangement protects those pipes, and keeps them from being twisted.

According to a still further embodiment of this invention, the main and auxiliary tanks are connected to the carburetor by separate pipes. If the quantity of fuel in the main tank decreases to a certain level, a sensor detects it, and transmits an indicating signal to the driver. The pump in the auxiliary tank is started either automatically or manually by the driver to supply fuel to the carburetor(s).

BRIEF DESCRIPTION OF THE DRAWINGS

FIG. 28 is a top plan view, partly in section, of an auxiliary fuel tank positioned with a fuel sensor;

FIG. 29 is a cross-sectional view of the tank shown in FIG. 28;

FIG. 30 is a side elevational view, partly in section, of a fuel tank assembly according to a further embodiment of this invention;

FIG. 31 is a sectional view taken along the line XXX—XXX of FIG. 30;

DETAILED DESCRIPTION OF THE PREFERRED EMBODIMENTS

Figure 1:
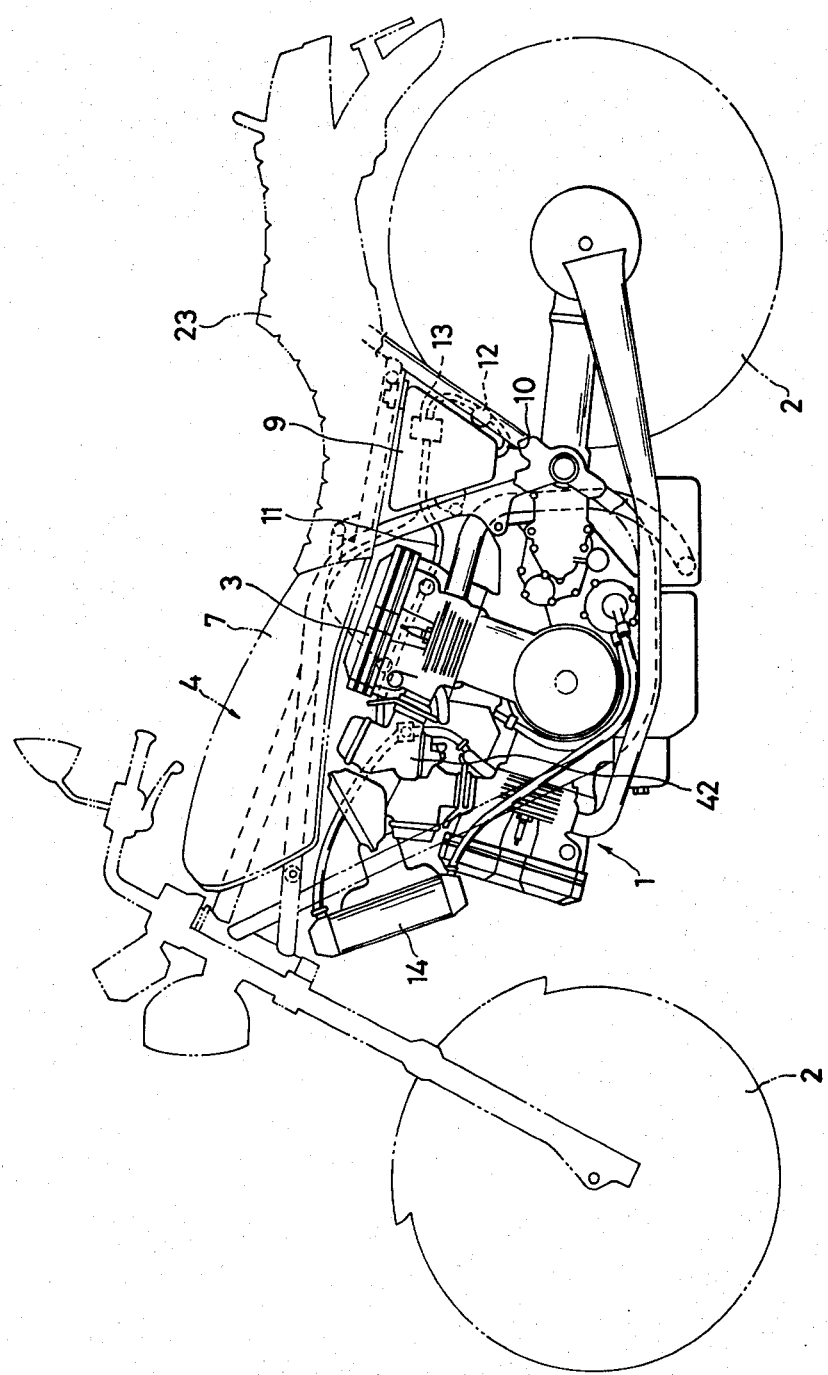
FIG. 1 is a side elevational view of a motorcycle provided with a fuel tank assembly embodying this invention.

Referring first to FIG. 1 of the drawings, there is shown a motorcycle provided with a fuel tank assembly embodying this invention. The motorcycle comprises a body 1, a pair of wheels 2, an engine 3, and a fuel tank assembly 4 disposed above the engine 3. The fuel tank assembly 4 comprises a main tank 7 positioned toward the front end of the body 1 and provided with a fuel inlet adjacent to its front end, and a fuel outlet adjacent to its rear end, and an auxiliary tank 9 positioned toward the rear end of the body 1 and at a level below the main tank 7, and having a fuel inlet connected to the fuel outlet of the main tank 7. The auxiliary tank 9 has a fuel outlet 10 to which a fuel conduit 11 is connected. A strainer 12 and a fuel pump 13 are provided on the fuel conduit 11. A radiator is shown at 14.

Figure 2:
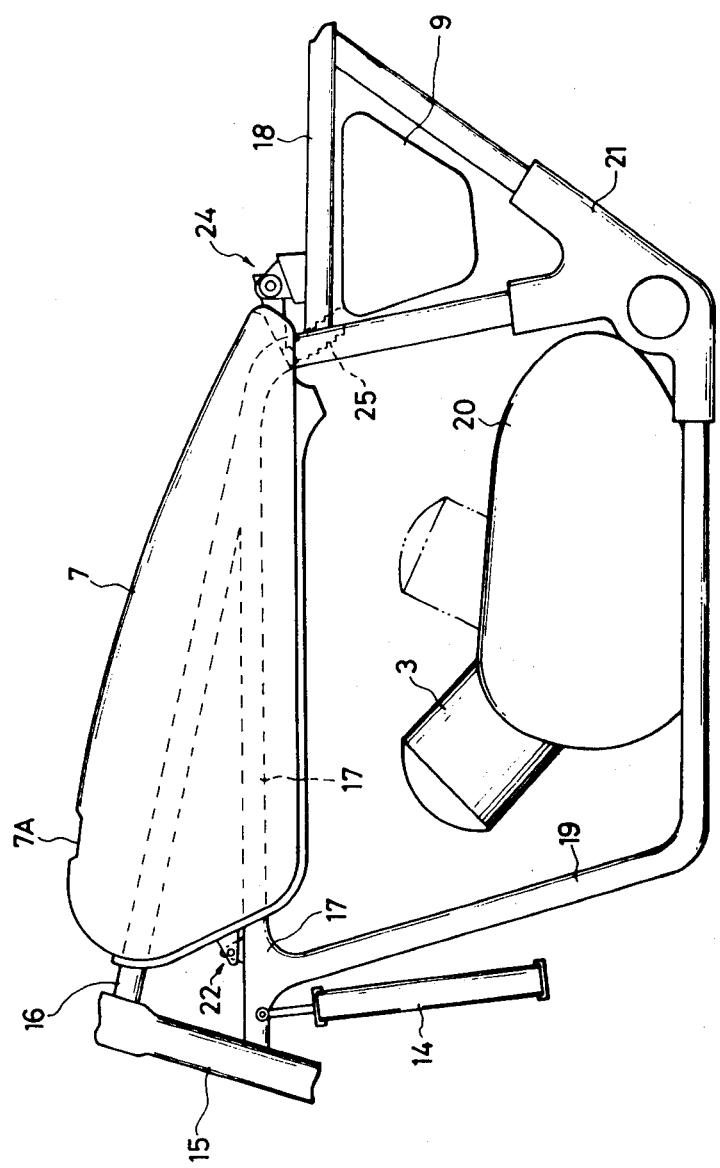
FIG. 2 is a fragmentary enlarged view schematically showing the fuel tank assembly of FIG. 1.

The body 1 essentially comprises a head pipe 15, an upper main frame 16, a lower main frame 17, a seat rail 18, and a down tube 19, as shown in FIG. 2. The lower main frame 17 is generally rectangular in side elevation, and carries at its bottom the engine 3, and a crankcase 20 containing gears and the like. The upper, lower and rear frames are connected to one another by a gusset 21. The upper main frame 16 comprises a pair of transversely spaced parallel members 16A and 16B (FIG. 8), and the lower main frame 17 likewise comprises a pair of transversely spaced parallel members 17A and 17B. The main tank 7 is mounted over those frame members. The main tank 7 has a front end facing the head pipe 15, and is supported removably on the lower main frame 17 by a mounting means 22. The mounting means 22 comprises a pair of transversely spaced brackets 22A provided on the front end of the main tank 7 on the lower portion thereof, a pair of transversely spaced brackets 22B provided on the lower frame members 17A and 17B, respectively, adjacent to the front ends thereof, the brackets 22A and 22B being provided with mutually aligned holes, and a bolt and nut assembly 22c extending through those holes, and holding the brackets 22A and 22B together. If the bolt and the nut are separated, the main tank can be removed from the body frame.

Figure 3A:
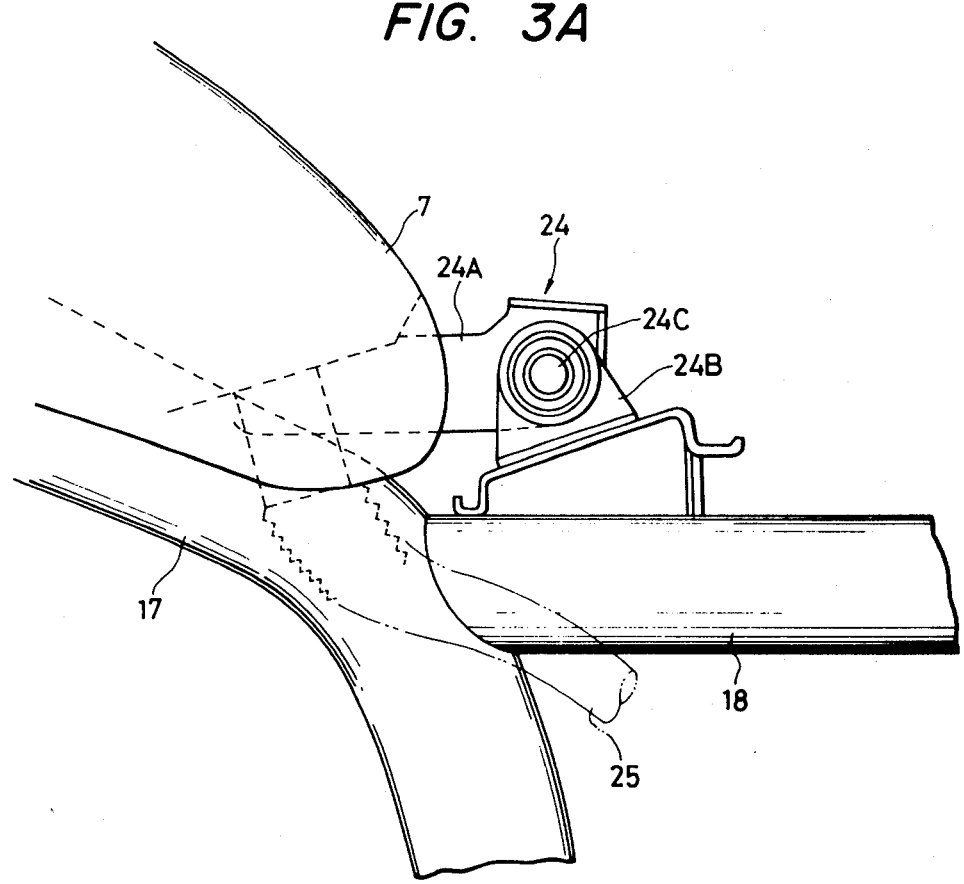
FIG. 3A is a fragmentary enlarged view showing a main fuel tank which is rotatably supported at its rear end.
Figure 3B:
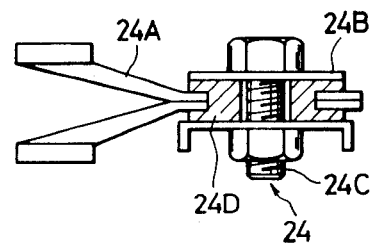
FIG. 3B is a fragmentary view of the supporting means of FIG. 3A.

The main tank 7 has a rear end facing a seat 23, and is provided with a means 24 for supporting the main tank 7 rotatably. As shown in FIGS. 3(A) and 3(B), the supporting means 24 comprises a stay 24A provided on the main tank, a stay 24B provided on the body frame, and a pivot shaft 24C by which the stays 24A and 24B are fastened together, and about which the stay 24A is rotatable. FIG. 3(B) is a cross sectional view taken along a horizontal plane extending through the center of the pivot shaft 24C in parallel to the seat rail 18, and shows a rubber bush 24D.

The auxiliary tank 9 is mounted in a space defined by one side of the lower frame 17 and the seat rail 18, and having a generally triangular shape in side elevation, as shown in FIG. 2. The auxiliary tank 9 is positioned at a height below the bottom of the main tank 7, and is connected thereto by a flexible fuel pipe 25 in the form of, for example, a bellows. The main tank 7 is provided with a fuel inlet 7A adjacent to its uppermost end. Fuel, which is introduced into the main tank 7 through the fuel inlet 7A, flows through the fuel pipe 25 to fill the auxiliary tank 9, and then the main tank 7 after the auxiliary tank 9 has been filled. Fuel is supplied from the auxiliary tank 9 to a carburetor 42 through a fuel conduit 11 having one end connected to the bottom of the auxiliary tank 9, and a fuel pump 13 as shown in FIG. 4.

Figure 4:
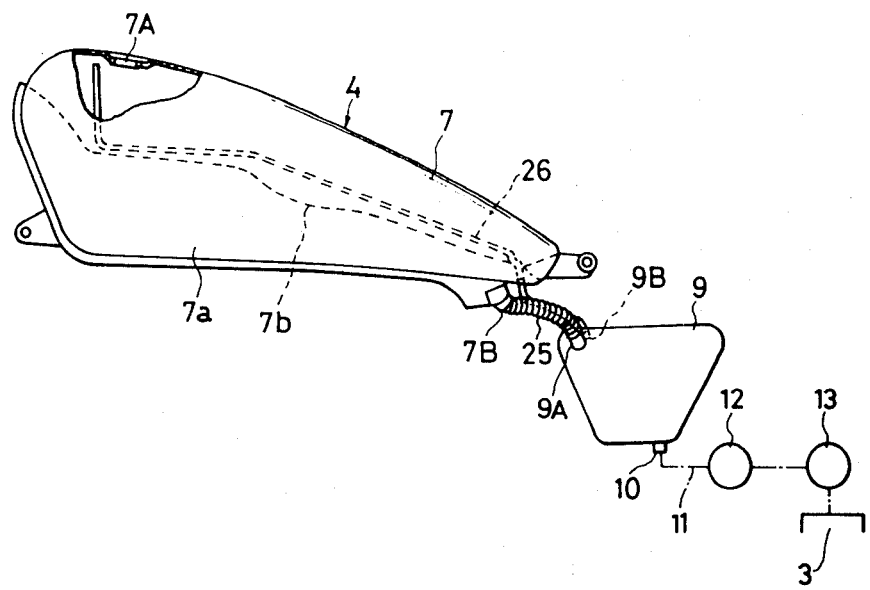
FIG. 4 is a side elevational view, partly in section, of the fuel tank assembly shown in FIG. 1.
Figure 5:
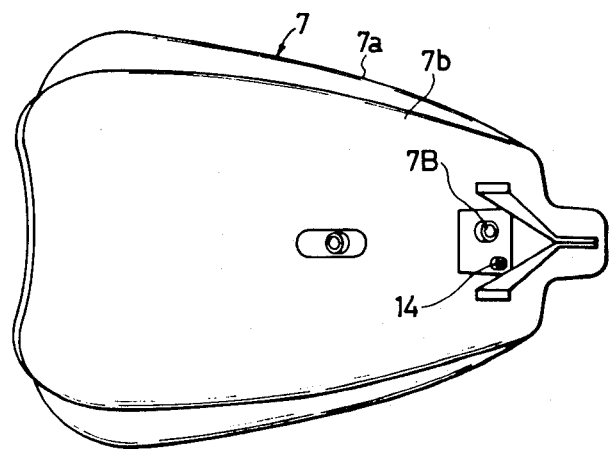
FIG. 5 is a bottom plan view of the main fuel tank shown in FIG. 4.
Figure 9:
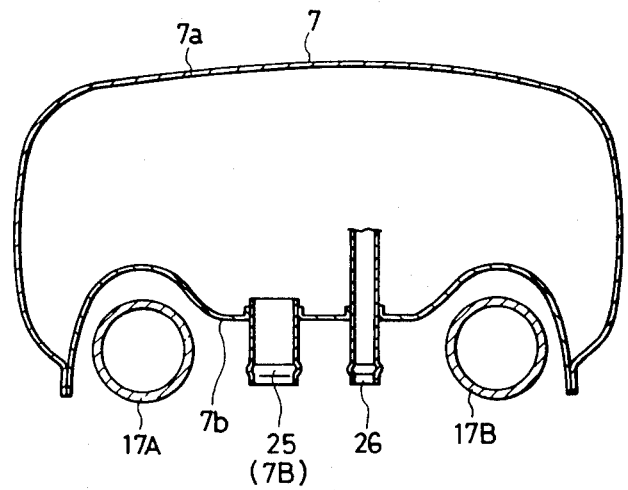
FIG. 9 is a cross sectional view of the fuel tank shown in FIG. 5.

Referring to FIGS. 4, 5 and 9, the fuel tank assembly further includes a breather pipe 26 having one end connected to an opening 9B provided at the top of the auxiliary tank 9, as shown in FIG. 4. The breather pipe 26 extends substantially in parallel to the fuel pipe 25, and into the main tank 7. The pipe 26 extends through the main tank 7 along the greater part of its length, and has an open end located close to the fuel inlet 7A, but not immediately below it. That portion of the pipe 26 which is exposed between the two tanks is formed from an expansible and flexible material, as is the fuel pipe 25. The open end of the pipe 26 in the main tank 7 is, of course, situated at a level above the highest level of fuel in the tank 7. The main tank 7 has a fuel outlet 7B, and the auxiliary tank 9 has a fuel inlet 9A. The fuel pipe 25 is connected between the outlet 7B and the inlet 9A.

The main tank 7 is formed by an upper outer plate 7a and an inner bottom plate 7b, and is mounted over the main frame members 17A and 17B, as shown in FIG. 9. The fuel outlet 7B is located between the frame members 17A and 17B, and is formed in the bottom plate 7b. The fuel pipe 25 is connected to the outlet 7B, and in parallel thereto, the breather pipe 26 extends through the bottom plate 7b into the main tank 7. Thus, the fuel pipe and the breather pipe are concealed between the transversely spaced frame members, so that the fuel tank assembly may present a neat appearance. The frame members also protect the fuel and breather pipes against damage from external sources.

The breather pipe 26 serves to withdraw air from the auxiliary tank 9 when fuel is introduced through the main tank 7. It is, therefore, possible to fill the auxiliary tank 9 with fuel before the main tank 7 is filled with fuel. Thus, the fuel tank assembly can be utilized to its full capacity.

Figure 6:
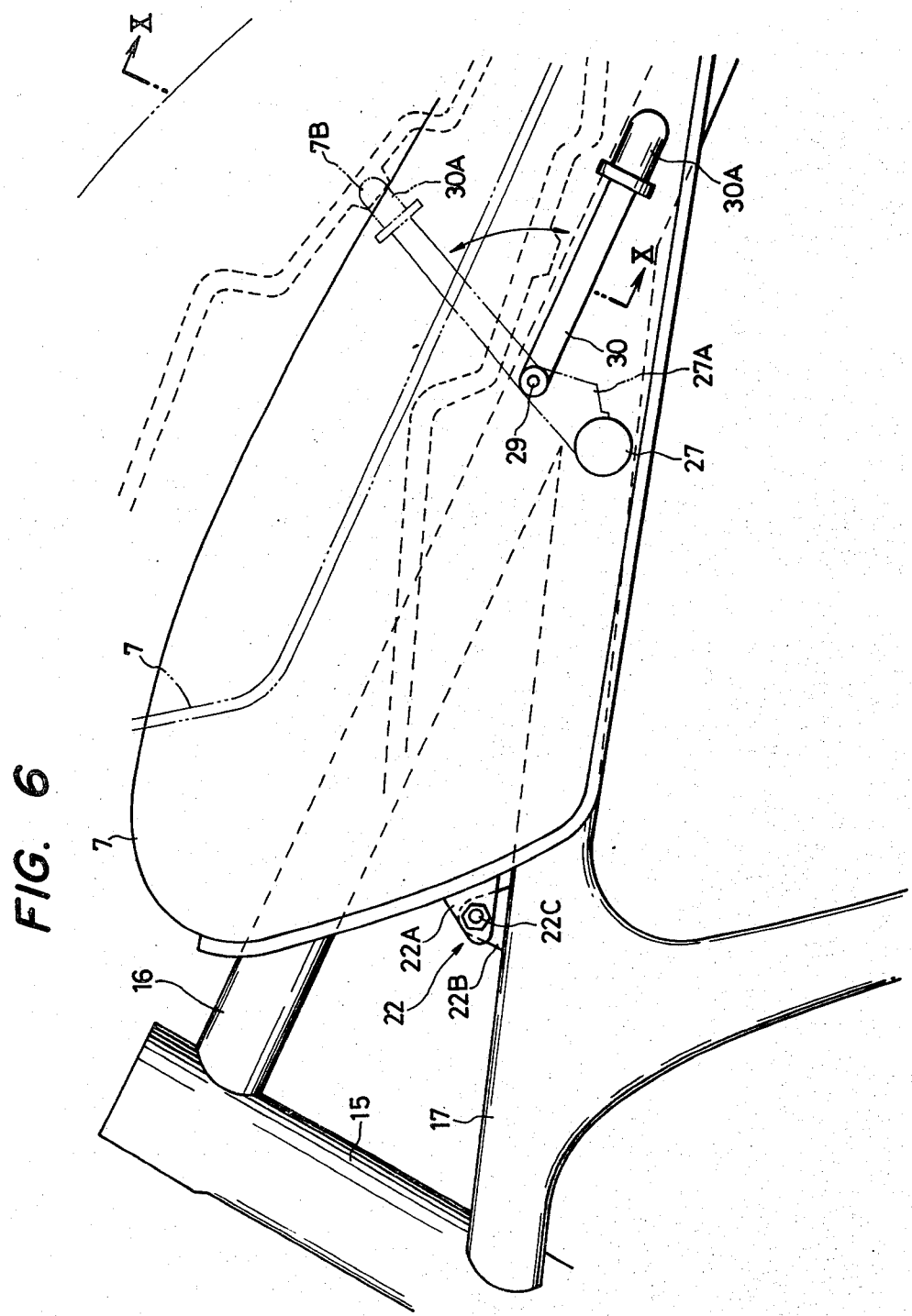
FIG. 6 is a fragmentary enlarged view illustrating the rotated position of the main fuel tank.
Figure 8:
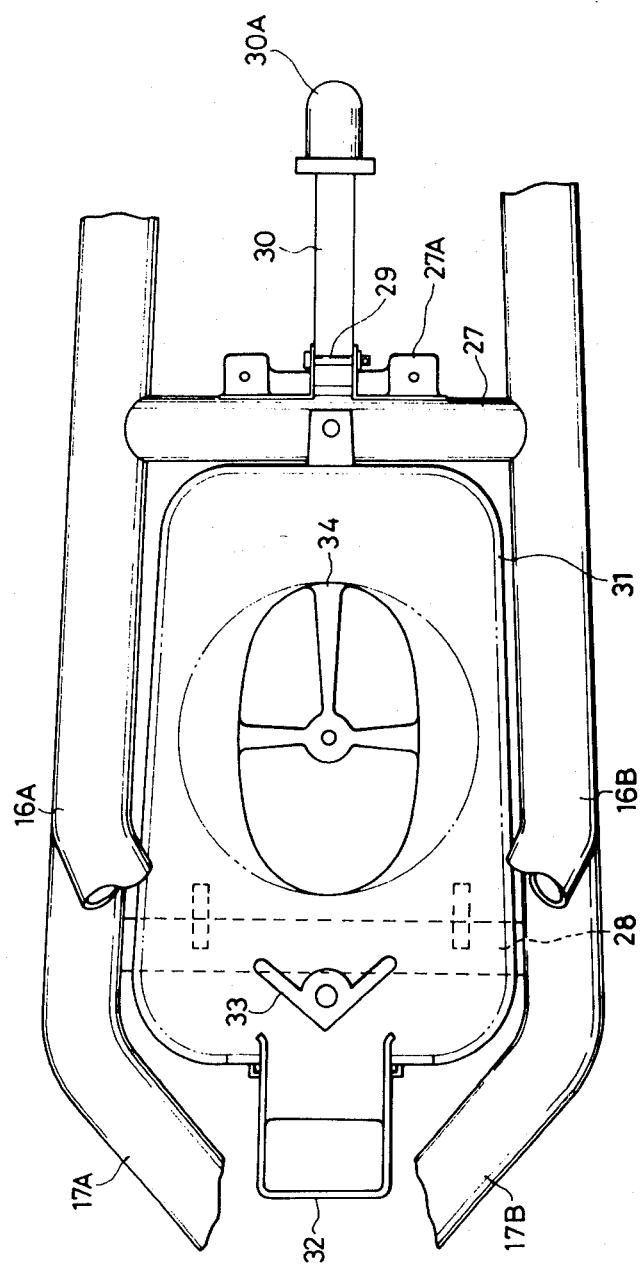
FIG. 8 is a top plan view of a motorcycle portion in the region above where the main fuel tank is mounted.

The upper and lower frames 16 and 17 meet each other in a region immediately below the main tank 7. A rear auxiliary frame member 27 extends transversely between the lower frame members 17A and 17B, as shown in FIGS. 6 and 8. A front auxiliary frame member 28 extends transversely between the lower frame members 17A and 17B toward the front ends thereof, as shown in FIG. 8.

A member 27A supporting a shaft 29 is secured to the rear auxiliary frame member 27 approximately in the center thereof. A supporting rod 30 is rotatable about the shaft 29, and has a free end covered by an elastic member 30A, such as a rubber cap. The supporting rod 30 is normally in its lower position parallel to the upper frame 16 as shown by solid lines in FIG. 6.

Figure 7:
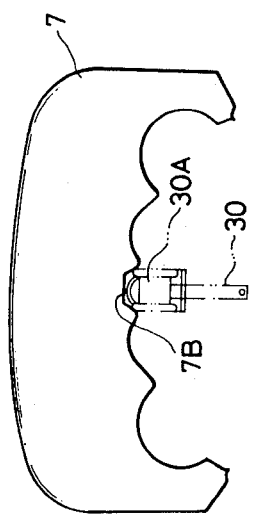
FIG. 7 is a schematic sectional view taken along the line X—X of FIG. 6.

If the front end of the tank 7 is released from the mounting means 22, and raised, the tank 7 can be rotated about the pivot shaft 24C in the supporting means 24 (FIGS. 2 or 3) to its raised position as shown by broken lines in FIG. 6. The tank 7 is provided in its bottom surface with a recess 7B for receiving the free end of the supporting rod 30 in the event that the rod 30 is manually rotated upwardly about the shaft 29 when the tank 7 is in its raised position, as shown in FIGS. 6 and 7. Various parts, such as an air cleaner 31, an intake pipe 32, a baffle 33 and a member 34 for pressing the air cleaner element, are installed below the tank 7, and when the tank 7 is raised, they are exposed as shown in FIG. 8. Thus, these parts can very easily be maintained and inspected without removal of the tank 7.

In the means 24 for supporting the rear end of the tank 7 as shown in FIGS. 2 and 3, the pivot shaft 24C is stationary. It is equally possible to employ, for example, a pivot shaft which is downwardly movable so that the tank 7 may be moved downwardly when it is rotated. If such a downwardly movable pivot shaft is employed, it is sufficient for the fuel pipe 25 and the breather pipe 26 to be merely flexible. They need not be expansible.

Figure 10:
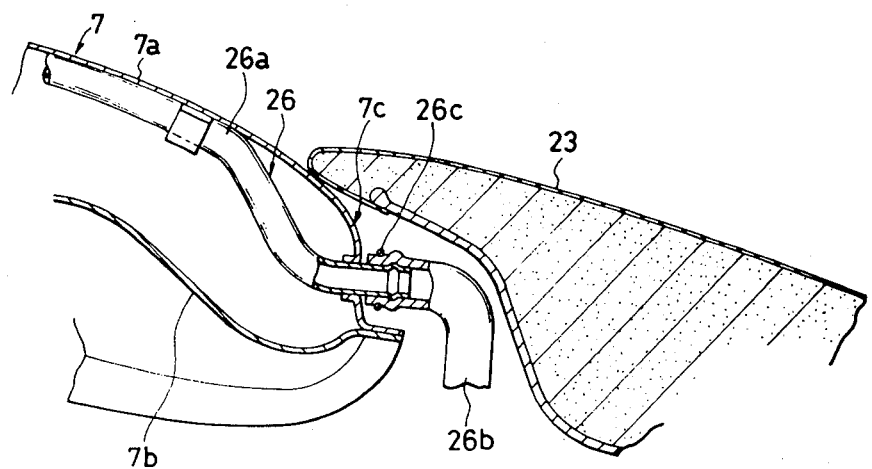
FIG. 10 is a fragmentary side elevational view, partly in section, of a fuel tank assembly according to a second embodiment of this invention.

Referring now to FIG. 10, there is shown a fuel tank assembly according to a second embodiment of this invention. The fuel tank assembly comprises a main tank 7 which is formed by an upper outer plate 7a and an inner bottom plate 7b. The outer plate 7a has a portion 7c covered by a driver's seat 23, or side covers (not shown), or the like. A breather pipe 26 extends through the portion 7c into the tank 7. The pipe 26 has a front half portion 26a extending through the tank 7 and secured thereto, and a rear half portion 26b which may be a hose removably connected to the front half portion 26a. The junction between the half portions 26a and 26b is tightened by a clip 26c, and is covered by the seat 23 and the like. As the breather pipe is, thus, concealed by the seat or the like, the fuel tank assembly of FIG. 10 presents a neat appearance. The assembly is simple in construction, and inexpensive.

Figure 11:
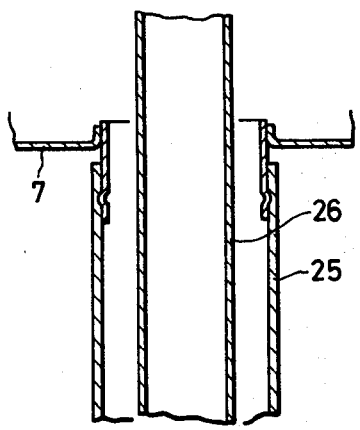
FIG. 11 is a fragmentary longitudinal sectional view showing a third embodiment of this invention.
Figure 12:
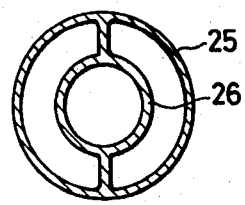
FIG. 12 is a cross sectional view of the assembly shown in FIG. 11.
Figure 13:
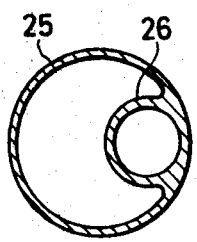
FIG. 13 is a cross sectional view showing a modified form of the structure shown in FIG. 12.

A fuel tank assembly according to a third embodiment of this invention is fragmentarily shown in FIGS. 11 and 12, and a modification thereof appears in FIG. 13. This embodiment is characterized by the location of the breather pipe 26 within the fuel pipe 25. The breather pipe 26 may be concentric with the fuel pipe 25 as shown in FIGS. 11 and 12, or eccentric as shown in FIG. 13. This arrangement facilitates the piping work between the main and auxiliary tanks and the fuel tank assembly presents a neat appearance.

Figure 14:
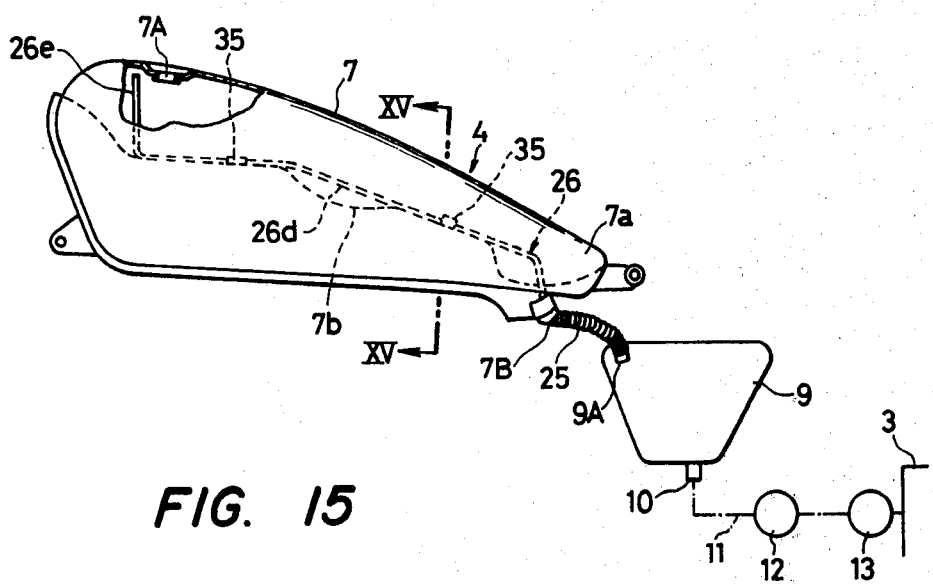
FIG. 14 is a side elevational view, partly in section, of a fuel tank assembly according to a fourth embodiment of this invention.
Figure 15:
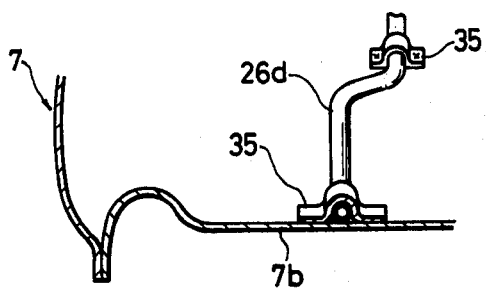
FIG. 15 is a sectional view taken along the line XIV—XIV of FIG. 14.

A fourth embodiment of this invention is shown in FIGS. 14 and 15, and is characterized by a breather pipe 26 lying on, and secured to the bottom of a main tank 7. The pipe 26 is secured more firmly than according to the first embodiment in which the breather pipe is welded to the bottom plate of the main tank only at a point where the pipe extends through the bottom plate. The pipe 26 has a portion 26d lying along, and secured to the bottom plate 7b of the main tank 7, and an upwardly bent end portion 26e opening in the vicinity of a fuel inlet 7A. The portion 26d is secured to the bottom plate 7b by a pair of mutually spaced stays 35, and is curved appropriately along the bottom plate to prevent any inclination of the end portion 26e. The main tank 7 further includes an upper outer plate 7a which is connected to the bottom plate 7b after the breather pipe portion 26d has been secured thereto. According to the fourth embodiment, the breather pipe can be secured to the main tank with high stability and rigidity, and there is no local concentration of stress that might result in breakage.

Figure 16:
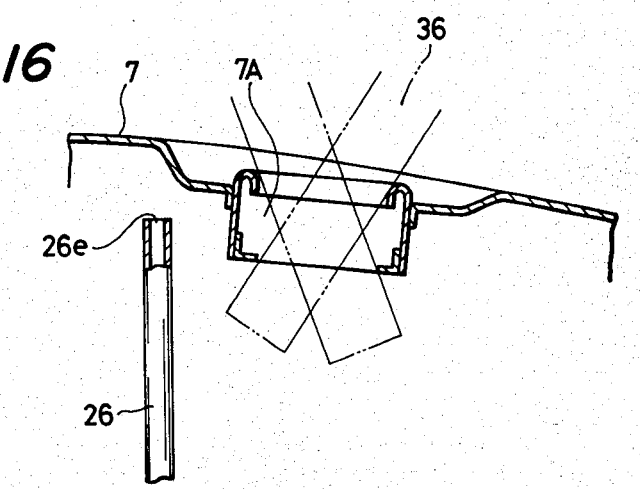
FIG. 16 is a fragmentary longitudinal sectional view showing the positional relationship between one end of a breather pipe and the fuel inlet of the main fuel tank.

FIG. 16 illustrates the free end of the breather pipe opening in the main tank in the fuel tank assembly according to any of the first to fourth embodiments of this invention. The free end 26e of the breather pipe 26 is directed upwardly, and opens in the vicinity of the fuel inlet 7A. When fuel is supplied into the fuel tank assembly, a nozzle 36 is inserted through the fuel inlet 7A as shown, by way of example, in two patterns in FIG. 16. The free end 26e is so positioned that the nozzle 36 may not interfere with the free end 26e at whatever angle it may be inserted. There is, thus, no possibility of fuel flowing into the breather pipe 26 and affecting its function.

In any of the embodiments as hereinabove described, the breather pipe 26 extends into the main tank 7 adjacent to its rear end. This feature provides the fuel tank assembly with a neat appearance, and substantially prevents any damage to the pipe 26, since it lies within the main tank along the majority of its length.

Figure 17:
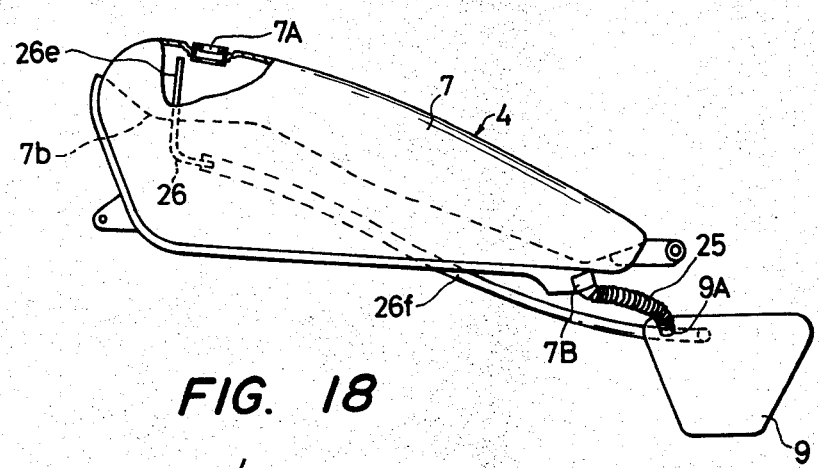
FIG. 17 is a side elevational view, partly in section, of a fuel tank assembly according to a fifth embodiment of this invention.
Figure 18:
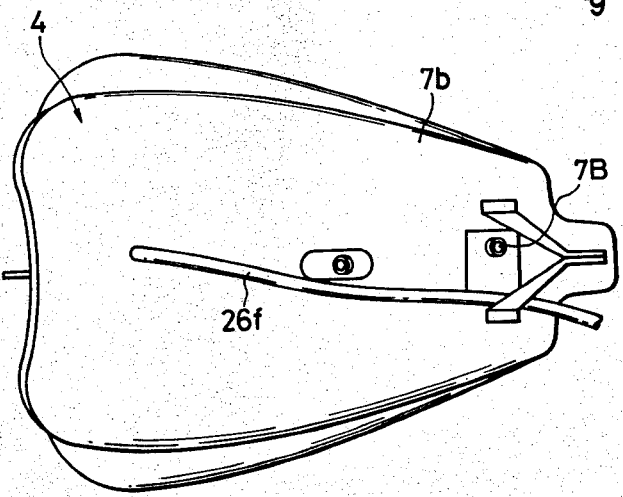
FIG. 18 is a bottom plan view of the main fuel tank shown in FIG. 17.
Figure 19:
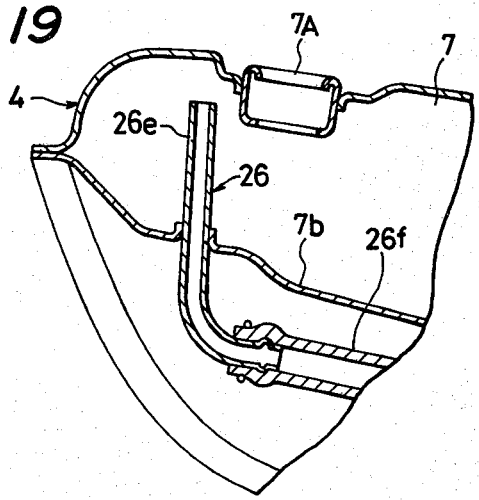
FIG. 19 is a fragmentary longitudinal sectional view of the main tank shown in FIG. 18.

Referring now to FIGS. 17 to 19, there is shown a fifth embodiment of this invention. This embodiment is characterized by a breather pipe extending outwardly of the main tank, and having a free end portion extending into the main tank. The breather pipe includes a breather pipe segment 26 extending into the main tank 7 adjacent to the front end thereof, while the tank fuel outlet 7B is provided adjacent to its rear end, and a connecting tube 26f is joined to the outer end of the segment 26. The connecting tube 26f extends along the bottom of the main tank 7, and is connected to the top of an auxiliary tank 9 to withdraw air from the auxiliary tank 9 and carry it to the open atmosphere through the main tank 7. The segment 26 extends into the main tank 7 through its bottom plate 7b, and opens at its upper end 26e in the main tank 7 in the vicinity of the fuel inlet 7A. The lower end of the segment 26 is bent substantially at right angles, and joined to the connecting tube 26f. The description of FIG. 16 may be taken into consideration when the position of the free end 26e relative to the fuel inlet 7A is selected. The location of the connecting tube exteriorly of the main tank enables easy breather piping, and accordingly provides the main tank with an increased volume, as compared with that where the breather pipe lies in the main tank substantially along its entire length.

Figure 20:
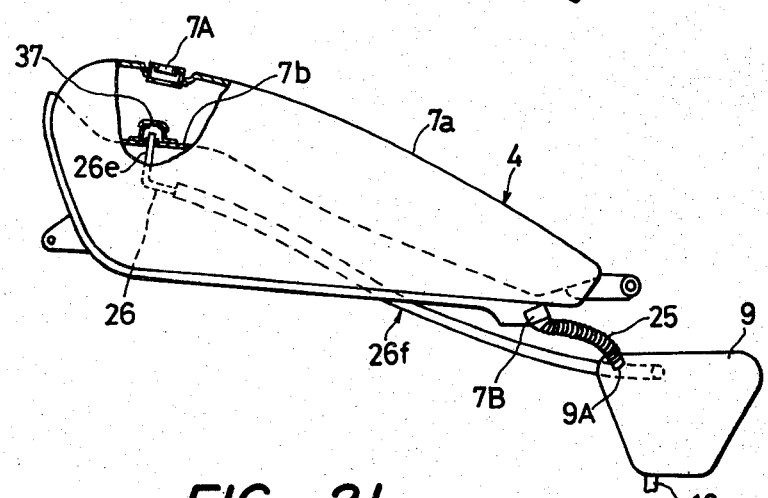
FIG. 20 is a side elevational view, partly in section, of a fuel tank assembly according to a sixth embodiment of this invention.
Figure 21:
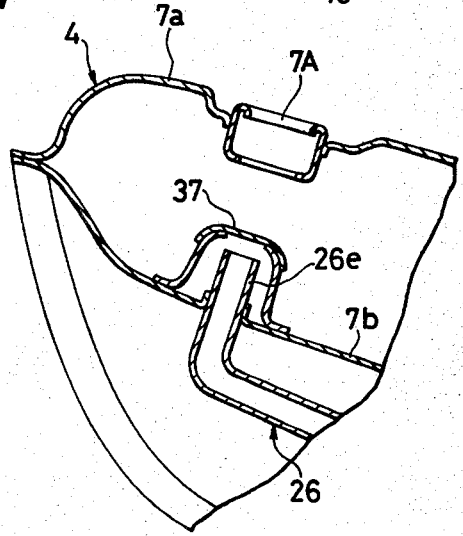
FIG. 21 is a fragmentary enlarged longitudinal sectional view of the main fuel tank shown in FIG. 20.
Figure 22:
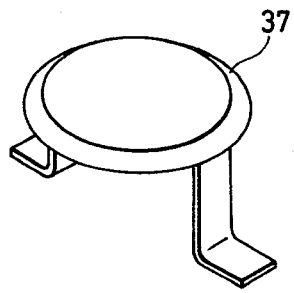
FIG. 22 is a perspective view of a baffle employed in the assembly shown in FIG. 21.
Figure 23:
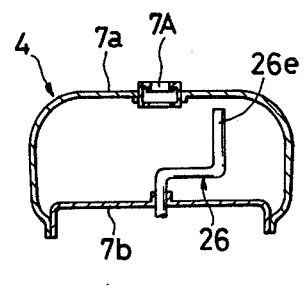
FIGS. 23 to 25 are cross-sectional views showing further modifications of the main fuel tank.
Figure 25:
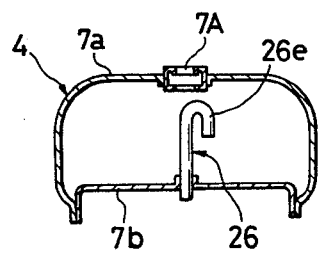
Figure 24:
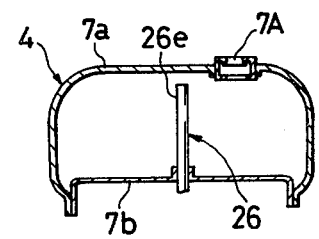

A sixth embodiment of this invention is shown in FIGS. 20 to 22, and some modifications thereof, and also of the arrangement shown in FIG. 16, are illustrated in FIGS. 21 to 25. This embodiment is characterized by the breather pipe 26 extending into the main tank immediately below its fuel inlet 7A, and a baffle 37 provided over the free end 26e of the breather pipe 26 to prevent fuel from entering the pipe 26 when it is injected through the fuel inlet 7A. Alternative arrangements not employing such baffle are shown by way of example in FIGS. 23 to 25. FIG. 23 shows a breather pipe 26 bent in the shape of a crank so that its open end 26e may not face the fuel inlet 7A. FIG. 24 shows the fuel inlet 7A displaced from the breather pipe 26. FIG. 25 shows a breather pipe 26 having a U-shaped end 26e. These arrangements are all effective in preventing fuel from entering the breather pipe during its injection. The fuel tank assembly according to the sixth embodiment, and its modifications shown in FIGS. 23 to 25 are simple in construction, and inexpensive to fabricate.

Figure 26:
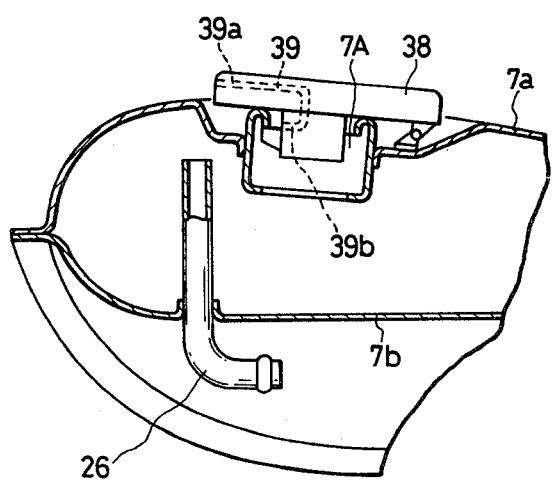
FIG. 26 is a fragmentary side elevational view, partly in section, of the main fuel tank having a fuel inlet cap.
Figure 27:
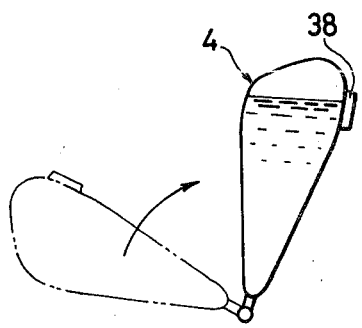
FIG. 27 is a schematic view showing the main fuel tank in its upright position.

The fuel tank assembly further includes a removable cap closing the fuel inlet 7A of the main tank. A breather passage may be provided in the cap for communicating the interior and exterior of the main tank to exhaust air to prevent any abnormal pressure elevation in the tank. The breather passage in the cap should always stay at a level which is higher than that of the fuel in the main tank, so that the fuel may not affect the function of the passage. Referring to FIG. 26, there is shown a cap 38 provided with a U-shaped breather passage 39 having a pair of open ends 39a and 39b both facing the front end of the main tank. The end 39a opens at the exterior of the tank, and the end 39b in the interior thereof. The inner end 39b always stays above the fuel level in the tank so that no fuel may enter the passage 39, even when the tank is in its raised position as shown in FIG. 27. The fuel tank assembly shown in FIG. 26 is simple in construction, and inexpensive to fabricate.

According to any of the embodiments hereinabove described, fuel is supplied from the bottom of the auxiliary tank to the engine. In order to detect the quantity of fuel remaining in the fuel tank assembly, a fuel sensor 40 is provided on the auxiliary tank 9. The sensor provided on the auxiliary tank can detect the remaining quantity of fuel correctly, since the auxiliary tank 9 is relatively small, and less complicated in cross section than the main tank 7 (see, for example, FIG. 7), and therefore, the surface of the fuel in the auxiliary tank does not move substantially when the motorcycle is running. The auxiliary tank 9 comprises two vertically split halves 9a and 9b as shown by way of example in FIGS. 28 and 29. One half 9b is provided with a tubular member 25-1 connected to the fuel inlet 9A and the fuel pipe 25, and a tubular member 26-1 connected to the breather pipe 26. The sensor 40 is provided on the half 9b in juxtaposed relation to the tubular members 25-1 and 26-1 as shown in FIG. 28. This arrangement facilitates the fabrication of the auxiliary tank. The sensor works more accurately when it is provided on the auxiliary tank than when it is provided on the main tank, for the reasons as hereinabove set forth.

A further embodiment of this invention is shown in FIGS. 30 and 31. According to this embodiment, fuel is supplied from both the main and auxiliary tanks to the engine. The main tank 7 is rotatable about the pivot shaft 24C. The main tank 7 is provided with an outlet cock 41 which is connected by a fuel conduit 43 to a carburetor 42. The cock 41 is secured to the body frame of the motorcycle so that the conduit 43 may not move when the tank 7 is raised. The auxiliary tank 9 is stationary, and mounted in a substantially triangular space in the mid-portion of the motorcycle. The tank 9 has a top portion 9-1 which is reduced in width as shown in FIG. 31. The top portion 9-1 is located within the seat rails 18, but at a level higher than the rails 18, though in any of the embodiments hereinbefore described, the auxiliary tank had a top situated at a level lower than the seat rails 18. Thus, the arrangement shown in FIGS. 30 and 31 contributes to increasing the volume of the auxiliary tank 9, and its capacity to hold fuel. As the top portion 9-1 is situated within the seat rails 18, the rails 18 serve to protect the tank 9 against damage from an external source.

The auxiliary tank 9 has a bottom portion 9-2 which is also reduced in width as shown in FIG. 31. The bottom portion 9-2 defines an external shoulder 9-3 in which a rectifier or like electrical component 44 can be neatly mounted, so that the fuel tank assembly may present a neat appearance. In FIG. 31, reference numeral 45 denotes a side cover. A fuel pipe 25 and a breather pipe 26 are connected to the tank 9, and extend horizontally in mutually parallel and closely adjacent relationship. The fuel pipe 25 is connected between the main and auxiliary tanks 7 and 9. The breather pipe 26 extends into the main tank 7, and terminates in an open end 26e in the vicinity of the fuel inlet 7A of the main tank 7 as shown in FIG. 30. The opposite end of the breather pipe 26 located in the auxiliary tank 9 is bent upwardly as shown in FIG. 31, so that the tank 9 may have an increased capacity. The fuel pipe 25 and the breather pipe 26 are located on the rear side of the auxiliary tank 9, and are, therefore, protected against damage. The pipes 25 and 26 are highly durable without being twisted upon rotation of the main tank 7, since they extend along the minimum possible distance between the tanks 7 and 9, and since the breather pipe 26 is located closer to the main tank 7 than the fuel pipe 25 is.

Figure 32:
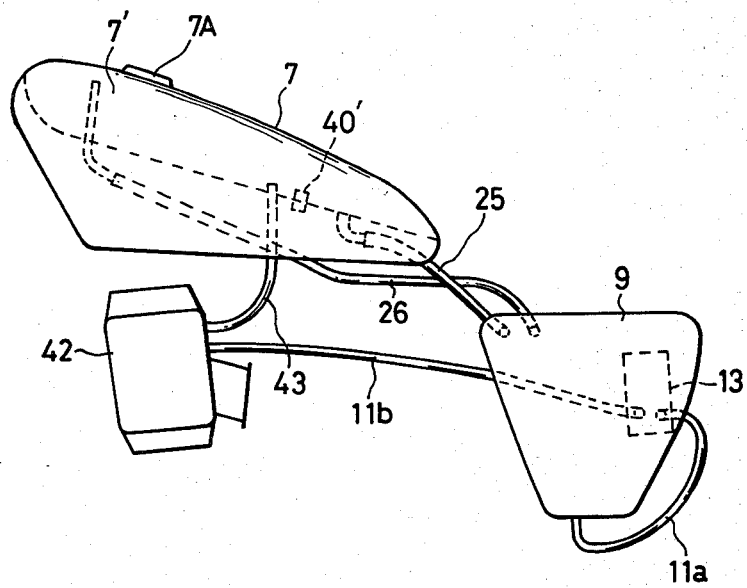
FIG. 32 is a side elevational view of a fuel tank assembly according to a still further embodiment of this invention.
Figure 33:
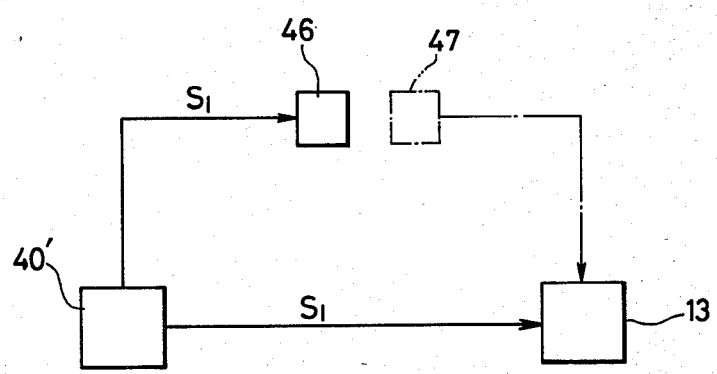
FIG. 33 is a block diagram of an electric circuit in the assembly shown in FIG. 32.

A still further embodiment of this invention is shown in FIGS. 32 and 33. According to this embodiment, fuel is supplied from both the main and auxiliary tanks to the carburetor as is the case with the fuel tank assembly shown in FIGS. 30 and 31. The main tank 7 has a fuel chamber 7' which is connected at its bottom to the top of the auxiliary tank 9 by fuel pipe 25. A breather pipe 26 is connected to the auxiliary tank 9, and extends into the main tank 7. A fuel sensor 40' is provided adjacent to the bottom of the fuel chamber 7', and does not work as long as the main tank is full of fuel. If the quantity of fuel in the main tank 7 decreases to a level dependent on the location of the sensor 40', the sensor 40' detects it, and transmits an electrical signal through an electric wire not shown.

A pump 13 is provided in the auxiliary tank 9 for delivering fuel to the carburetor 42. The pump 13 has an inlet connected to the bottom of the tank 9 by a conduit 11a, and an outlet connected to the carburetor 42 by a conduit 11b. Upon receiving an electrical signal from the fuel sensor 40' under certain conditions, the pump 13 functions to supply fuel from the auxiliary tank 9 to the carburetor 42 through the conduit 11b. As fuel is not supplied by gravity, but by the pump 13, it is possible to select the location of the auxiliary tank 9 irrespective of the position of the carburetor 42. The pump 13 is connected to the sensor 40' electrically, though not specifically shown. The main tank 7 is located above the carburetor 42, and connected thereto by a conduit 43 through which fuel is supplied from the tank 7 to the carburetor 42 by gravity.

FIG. 33 is a block diagram showing an electrical circuit including the pump 13 and the fuel sensor 40'. The circuit includes an alarm 46 provided in an instrument panel in front of the driver, and an electric switch 47 provided on the handlebar for actuating the pump 13. The switch 47 may be operated by the driver after recognizing the alarm 46. The switch 47 is shown by phantom lines, since it is not necessarily an essential component.

Fuel is supplied into the fuel tank assembly through the fuel inlet 7A of the main tank 7. As long as the main tank 7 contains a sufficiently large quantity of fuel, fuel is supplied from the main tank 7 to the carburetor 42 through the conduit 43. Upon a decrease of the fuel in the main tank 7 to a certain level, which depends on the location of the fuel sensor 40', the sensor 40' detects it, and transmits a signal $S_1$ indicating the decrease of fuel in the main tank 7 to the alarm 46 and the pump 13. The alarm 46 warns the driver of the decrease in fuel in the main tank 7, and the pump 13 is started to supply fuel from the auxiliary tank 9 to the carburetor 42 through the conduits 11a and 11b. The driver does not need to do anything to operate the pump 13 to continue driving the motorcycle. Alternatively, however, it is possible to employ the switch 47 as hereinbefore described with reference to FIG. 33.

The fuel tank assembly shown in FIGS. 32 and 33 provides a number of advantages. The elimination of any mechanical fuel cock provides the fuel tank assembly with a neat appearance. The ease of operation is enhanced by the elimination of any mechanical cock operation, and the electrical arrangement which enables fuel to be supplied by the auxiliary tank automatically or manually. The alarm enables the driver to recognize the reduction in fuel in a timely manner. The provision of the pump for the auxiliary tank allows a wide range of freedom in the selection of the position of the auxiliary tank, and in the design of the motorcycle as a whole. The pump is durable, since it is operated only on the occasion of fuel reduction in the main tank; and is, therefore, not subjected to any heavy operation load.

As is obvious from the foregoing description, this invention provides numerous advantages. According to this invention, the auxiliary tank is disposed at a lower height than the main tank, and a breather pipe is connected to the auxiliary tank and extends under or through the main tank to a point in the vicinity of the fuel inlet of the main tank. This feature enables easy removal of air from the auxiliary tank, and utilization of the full capacity of the auxiliary tank, and therefore, of the fuel tank assembly as a whole.

According to another aspect of this invention, the main tank is vertically rotatably supported on the body frame of the motorcycle, and is connected to the auxiliary tank by an expansible or flexible fuel pipe. This construction enables the inspection and maintenance of the underlying parts without complete removal of the main tank, and ensures a high degree of efficiency in any such inspection and maintenance, particularly of the air cleaner. The use of the expansible or flexible pipe between the main and auxiliary tanks provides wide freedom in the piping arrangement.

What is claimed is:

1. A fuel tank assembly for a motorcycle having a frame body, an engine disposed at a central portion of said frame body, a main fuel tank disposed above said engine, a front wheel steering member positioned in front of said main tank, a seat positioned rearwardly of said main tank, and a rear wheel, comprising; an auxiliary tank disposed below said main tank, and positioned in a space defined by said seat, said engine and said rear wheel, supporting means for pivotally supporting said main tank at its rear portion, a fuel conduit having one end connected to said main fuel tank and the other end to said auxiliary tank, said fuel conduit being positioned adjacent to said supporting means and movable in response to pivotable movement of said main tank, and a breather pipe having one end disposed in said main tank and the other end disposed in said auxiliary tank, said breather pipe movable in response to pivotable movement of said main tank.

2. An assembly as claimed in claim 1, wherein said breather pipe extends through a bottom portion of said main tank, and has its one end located proximate a fuel inlet of said main tank.

3. An assembly as claimed in claim 1, wherein said breather pipe has a substantial portion which extends within said main tank, wherein said substantial portion of said breather pipe includes a portion secured to a bottom of said main tank and a vertical portion extending from the bottom of the tank towards a top thereof and terminating at a location proximate to but offset from a fuel inlet of said main tank.

4. An assembly as claimed in claim 3, the top end of said vertical portion being located at an elevation substantially equal to that of said fuel inlet.

5. An assembly as claimed in claim 3, said breather-pipe vertical portion including a cranked portion.

6. An assembly as claimed in claims 1 or 5, further including a baffle provided over said one end of said breather pipe.

7. An assembly as claimed in claim 3, said vertical portion of said breather pipe including a bent over portion at said one end thereof.

8. An assembly as claimed in claim 1, said fuel conduit comprises a flexible pipe, and wherein at least a part of said breather pipe extends within said fuel conduit.

9. An assembly as claimed in claim 8, said breather pipe and said fuel conduit being concentric.

10. An assembly as claimed in claim 8, said breather pipe being eccentrically disposed within said fuel conduit.

11. An assembly as claimed in claim 1, said fuel conduit comprises a flexible, expansible pipe, and wherein said breather pipe includes at least a portion extending within said main tank, and a separable connector portion bridging a space between said main and auxiliary tanks.

12. An assembly as claimed in claim 1, wherein a substantial portion of said breather pipe extends along a bottom of said main tank.

13. An assembly as claimed in claim 12, wherein said breather pipe extends exteriorly of said main tank along said bottom thereof.

14. An assembly as claimed in claim 13, said breather pipe extending through a forward portion of said bottom of said main tank.

15. An assembly as claimed in claim 1, said fuel conduit and said breather pipe each including portions extending through a bottom rear portion of said main tank.

16. An assembly as claimed in claim 1, said fuel conduit and said breather pipe both being hidden from view by other parts of said motorcycle, said fuel conduit and said breather pipe having the other end portion connected to said auxiliary tank at an inward portion thereof, said auxiliary tank having a top portion positioned inwardly from a seat rail extending longitudinally.

17. An assembly as claimed in claim 1, further including means located on a bottom of said tank for receiving a support for holding said tank in a pivoted position.

18. An assembly as claimed in claim 1, further including a cap sealing a fuel inlet of said tank, and including a vent passage therein extending from a forward internal portion of said cap to a forward external portion thereof.

19. An assembly as claimed in claim 1, further including a fuel sensor disposed in either said auxiliary tank or said main tank, said fuel sensor being electrically connected to a fuel pump disposed in said auxiliary tank for actuating said pump.

20. An assembly as claimed in claim 19, further comprising; a first fuel line extending from said auxiliary tank to a fuel evaporation and injection means of said motorcycle, and a second fuel line extending from said main tank to said fuel evaporation and injection means, said fuel sensor detecting a predetermined fuel decrease of said main tank and actuating said fuel pump in said auxiliary tank upon detection to thereby supply fuel in said auxiliary tank to said fuel evaporation and injection means.

* * * * *